(12) United States Patent
Thurn et al.

(10) Patent No.: US 7,274,538 B2
(45) Date of Patent: *Sep. 25, 2007

(54) SENSOR WITH SEMI-PERMANENTLY DEFORMABLE ELEMENT FOR ACTIVE ELEMENT ADJUSTMENT

(75) Inventors: Jeremy Adam Thurn, Eagan, MN (US); Declan Macken, Prior Lake, MN (US); Dale Eugene Egbert, Deephaven, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/265,628

(22) Filed: Nov. 2, 2005

(65) Prior Publication Data

US 2006/0061910 A1    Mar. 23, 2006

Related U.S. Application Data

(63) Continuation of application No. 10/465,756, filed on Jun. 19, 2003, now Pat. No. 6,992,865.

(51) Int. Cl.
*G11B 5/56* (2006.01)

(52) U.S. Cl. .................. 360/294.7; 360/234.7

(58) Field of Classification Search ............. 360/294.7, 360/234.7
See application file for complete search history.

(56) References Cited

U.S. PATENT DOCUMENTS

| 3,732,552 | A | * | 5/1973 | Walraven | 360/75 |
| 4,374,402 | A | * | 2/1983 | Blessom et al. | 360/266.2 |
| 4,864,824 | A | | 9/1989 | Gabriel et al. | |
| 5,021,906 | A | | 6/1991 | Chang et al. | |
| 5,031,055 | A | * | 7/1991 | Yanagisawa | 360/294.7 |
| 5,390,059 | A | * | 2/1995 | Tokuyama et al. | 360/246.6 |
| 5,463,514 | A | | 10/1995 | Yaeger | |
| 5,991,113 | A | | 11/1999 | Meyer et al. | |
| 6,441,982 | B1 | | 8/2002 | Fukushima et al. | |
| 6,454,913 | B1 | | 9/2002 | Rasmussen et al. | |
| 6,570,730 | B1 | | 5/2003 | Lewis et al. | |
| 6,870,709 | B2 | * | 3/2005 | Shimanouchi et al. | 360/294.4 |
| 2002/0122268 | A1 | | 9/2002 | Bement et al. | |
| 2003/0235014 | A1 | | 12/2003 | Yamanaka et al. | |

OTHER PUBLICATIONS

Article from *Journal of Applied Physics*, vol. 86, No. 9, entitled "Tensile Testing of AlCu Thin Films on Polyimide Foils", by F. Macionczyk/W. Brückner, pp. 4922-4929, Dated Nov. 1, 1999.

(Continued)

*Primary Examiner*—A. J. Heinz
(74) *Attorney, Agent, or Firm*—Kinney & Lange, P.A.

(57) ABSTRACT

A sensor comprises a transducer portion including a semi-permanently deformable portion. A deformation of the semi-permanently deformable portion in response to an activation energy deforms the transducer portion. The deformation is retained after the activation energy is removed. In another embodiment of the invention, a transducer comprises a body having an active element, a magnetostrictive element and a magnet having a magnetic field. The magnetic field causes a deformation of the magnetostrictive portion thereby adjusting the position of the active element.

18 Claims, 9 Drawing Sheets

OTHER PUBLICATIONS

Article from *Mat. Res. Soc. Symp. Proc.* vol. 563, entitled "Measurement of Thin Film Mechanical Properties by Microbeam Bending", by J. Florando/H. Fujimoto/Q. Ma/O. Kraft/R. Schwaiger/W. D. Nix, pp. 231-236, dated 1999.

Article from *Metallurgical Transactions A*, vol. 20A, entitled "Mechanical Properties of Thin Films", by William Nix, pp. 2217-2245, Dated Nov. 1989.

Article entitled "Shape Memory Alloys", by D. Hodgson/M. Wu/R. Biermann, dated 1990.

Article from *Journal of Applied Physics*, vol. 81, No. 8, entitled "Magnetoresistive Properties of Amorphous and Partially Crystalline TbDyFe Thin Films", by A. Speliotis/O. Kalogirou/D. Niarchos, pp. 5696-5698, Dated Apr. 15, 1997.

Article from *Journal of Applied Physics*, vol. 75, No. 10, entitled "Magnetostriction In Polycrystalline Sputter-Deposited TbDyFe Films", by P. Williams/D. Lord/P. Grundy, pp. 5257-5261, Dated May 15, 1994.

Article from *Journal of Applied Physics*, vol. 87, No. 9, entitled "Occurrence of Ferromagnetic Shape Memory Alloys (Invited)", by M. Wuttig/L. Liu, pp. 4707-4711, Dated May 1, 2000.

Article from *Journal of Micromechanics And Microengineering*, entitled "The Effects of Process-Induced Stress on the Microstructures and the Phase Transformation Characteristics of Sputtered Titanium-Nickel Thin-Film Shape-Memory Alloys", pp. 686-691, Dated Oct. 12, 2001.

Article from *Mat. Res. Soc. Symp. Proc.*, vol. 459, entitled "Shape Memory Thin Films of the System Ti(Ni-Pd-Cu)", by E. Quandt/H. Holleck, pp. 465-470, Dated 1997.

Article from *J. Vac. Sci. Technol. A*, A 16(6), entitled "Growth of High-Temperature NiTi$_{1-x}$Hf$_x$ Shape Memory Alloy Thin Films by Laser Ablation of Composite Targets", by H. Gu/K. Leung/C. Chung, pp. 3420-3422, Dated Nov./Dec. 1998.

Article from *Applied Physics Letters*, vol. 77, No. 20, entitled "Stree-Free Two-Way Thermoelastic Shape Memory and Field-Enhanced Strain in Ni$_{52}$Mn$_{24}$Ga$_{24}$ Single Crystals", by W. Wang/G. Wu/J. Chen/C. Yu/S. Gao/W. Zhan, pp. 3245-3247, Dated Nov. 13, 2000.

* cited by examiner

SENSOR WITH SEMI-PERMANENTLY DEFORMABLE ELEMENT FOR ACTIVE ELEMENT ADJUSTMENT

CROSS REFERENCE TO RELATED APPLICATION(S)

This is a continuation application of application Ser. No. 10/465,756 entitled "Headstack With Semi-Permanently Deformable Element For Pole-Tip Recession Adjustment" and filed Jun. 19, 2003 by Jeremy Adam Thurn, et al., now issued as U.S. Pat. No. 6,992,865.

BACKGROUND OF THE INVENTION

The present invention relates to an air bearing slider for use in a data storage device such as a disc drive. More particularly it relates to an air bearing slider capable of operating at ultra-low flying heights.

Air bearing sliders have been extensively used in magnetic disc drives to appropriately position a transducing head above a rotating disc. In a disc drive, each transducer "flies" just a few nanometers above a rotating disc surface. The transducer is mounted in a slider assembly which has a contoured surface. An air bearing force is produced by pressurization of the air as it flows between the disc and slider and is a consequence of the slider contour and relative motion of the two surfaces. The air force prevents unintentional contact between the transducer and the disc. The air bearing also provides a very narrow clearance between the slider transducer and the rotating disc. This allows a high density of magnetic data to be transferred and reduces wear and damage.

In most high capacity storage applications, when the disc is at rest, the air bearing slider is in contact with the disc. During operation, the disc rotates at high speeds, which generates a wind of air immediately adjacent to the flat surface of the disc. This wind acts upon a lower air bearing surface of the slider and generates a lift force directing the slider away from the disc and against a load beam causing the slider to fly at an ultra-low height above the disc.

In negative pressure sliders, the wind also acts upon a portion of the air bearing surface of the slider to generate a suction force. The suction force counteracts the lift force by pulling the slider back toward the surface of the disc. A slider is typically mounted on a gimbal and load beam assembly which biases the slider toward the rotating disc, providing a pre-load force opposite to the lift force acting on the air bearing surface of the slider. For the slider to maintain the ultra-low flying height above the surface of the disc, the lift force must be balanced with the pre-load and suction forces.

As disc storage systems are designed for greater and greater storage capacities, the density of concentric data tracks on discs is increasing (that is, the size of data tracks and radial spacing between data tracks is decreasing), requiring that the air bearing gap between the transducing head carried by the slider and the rotating disc be reduced. One aspect of achieving higher data storage densities in discs is operating the air bearing slider at ultra-low flying heights.

However, shrinking the air bearing gap and operating the slider at ultra-low flying heights has become a source of intermittent contact between the transducing head and the disc. Furthermore, when a disc drive is subjected to a mechanical shock of sufficient amplitude, the slider may overcome the biasing pre-load force of the load beam assembly and further lift away from or off the disc. Damage to the disc may occur when the slider returns to the disc and impacts the disc under the biasing force of the load beam. Such contact can result in catastrophic head-disc interface failure. Damage to the disc may include lost or corrupted data or, in a fatal disc crash, render the disc drive inoperable. Contact resulting in catastrophic failure is more likely to occur in ultra-low flying height systems. Additionally, intermittent contact induces vibrations detrimental to the reading and writing capabilities of the transducing head.

For the disc drive to function properly, the slider must maintain the proper fly height and provide adequate contact stiffness to assure that the slider does not contact the disc during operation. Also, the air bearing slider must have enhanced take-off performance at start up to limit contact between the slider and the disc. Such contact would cause damage to the slider during take-off and landing of the slider.

Air bearing sliders typically possess three primary degrees of movement, which are vertical motion, pitch, and roll rotation. The movement is relative to the gimbal and load beam associated with three applied forces upon the slider defined as pre-load, suction, and lift force. Steady state fly attitude for the slider is achieved when the three applied forces balance each other. A typical air bearing slider has a taper or step at its leading edge to provide for fast pressure buildup during takeoff of the slider from a resting position to a flying altitude above the disc. Air bearing sliders have a trailing edge at which thin film transducers are deposited. Typically, the air bearing surface includes longitudinal rails or pads extending from the leading edge taper toward the trailing edge. The rail design determines the pressure generated by the slider. The pressure distribution underneath the slider determines the flying characteristics, including flying height and pitch and roll of the slider relative to a rotating magnetic disc. Other characteristics that are affected by the configuration of the air bearing surface of a slider are takeoff velocity, air bearing stiffness, and track seek performance.

Flying height is one of the most critical parameters of magnetic recording. As the average flying height of the slider decreases, the transducer achieves greater resolution between the individual data bit locations on the disc. Therefore, it is desirable to have the transducers fly as close to the disc as possible.

In a conventional air bearing slider, the slider body is formed from a substrate wafer of conductive ceramic material. On this substrate, a thin film of insulating material is deposited, and a metallic transducer is built therein, by a process such as sputtering. The transducer, which typically includes a writer portion for storing magnetically-encoded information on a magnetic media and a reader portion for retrieving that magnetically-encoded information from the magnetic media, is formed of multiple layers successively stacked upon the substrate. The volume of the transducer is typically much smaller than the volume of the substrate.

The wafer with transducers formed thereon is then cut into bars, and a cut edge of each bar is lapped to form an air bearing surface. The layers of the transducer, which include both metallic and insulating layers, all have different mechanical and chemical properties than the substrate. These differences in properties affect several aspects of the transducer. First, the different materials of the slider will be lapped at different rates. Because of the difference in hardness or lapping durability of the wafer substrate material, the thin film insulating material, and the transducers, the lapping operation results in differential recession of the materials at the air bearing surface.

Thus, when an air bearing surface of a slider is lapped during its fabrication, differing amounts of the different materials will be removed B resulting in the slider having a uneven air bearing surface. The recession of a particular component is defined as the distance between the air bearing surface of the ceramic substrate and the air bearing surface of that component. Commonly, a greater amount of the metallic layers of the transducer will be removed during the lapping process than will be removed from the slider body substrate. Thus, this lapping process results in a Pole Tip Recession (PTR) of the metallic layers of the transducer with respect to the slider body substrate.

Additionally, the insulating material will often recede at an even greater rate than the transducer, leading to material recession that results in a discernable offset at the interface of the insulating material and the slider body substrate material. The offset prevents the transducer from flying as close to the surface of the magnetic disc as would otherwise be possible.

Further, the differing mechanical and chemical properties of the substrate and transducer layers further affect the air bearing surface during operation of the transducing head. As the magnetic data storage and retrieval system is operated, the transducing head is subjected to increasing temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

During operation of the magnetic data storage and retrieval system, the transducing head is positioned in close proximity to the magnetic media. A distance between the transducer and the media is preferably small enough to allow for writing to and reading from a magnetic medium having a large areal density, and great enough to prevent contact between the magnetic media and the transducer. Performance of the transducer depends primarily on this distance.

Thus, a need exists for an air bearing slider design which achieves a constant, ultra-low transducer flying height, despite the obstacles of differential mechanical recession.

BRIEF SUMMARY OF THE INVENTION

The present invention is a sensor, which comprises a transducer portion including a semi-permanently deformable portion. A deformation of the semi-permanently deformable portion in response to an activation energy deforms the transducer portion. The deformation is retained after the activation energy is removed. In another embodiment of the invention, a transducer comprises a body having an active element, a magnetostrictive element and a magnet having a magnetic field. The magnetic field causes a deformation of the magnetostrictive portion thereby adjusting the position of the active element.

DETAILED DESCRIPTION

Figure 1:
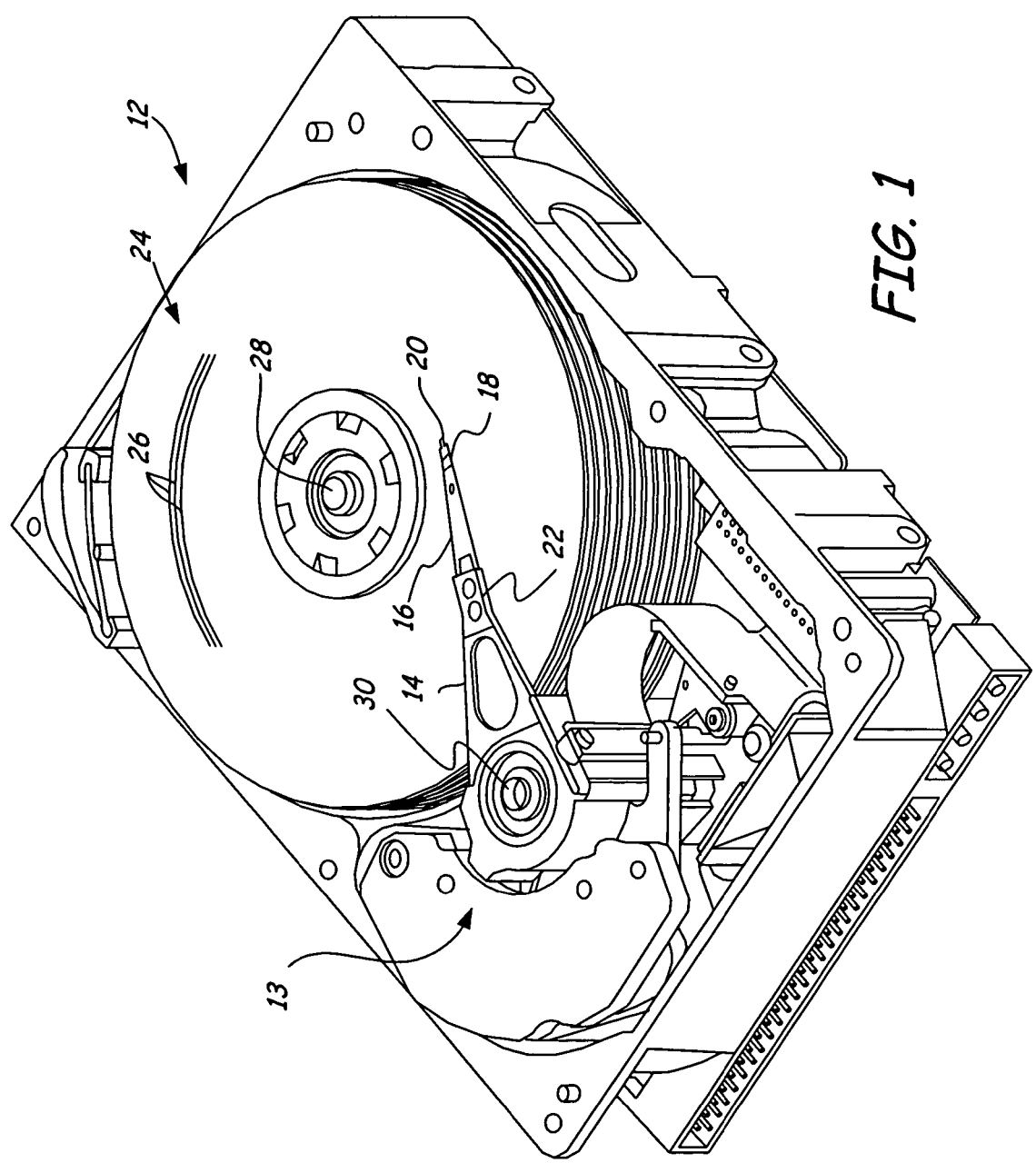
FIG. 1 shows a top perspective view of a disc drive.

FIG. 1 shows a top perspective view of a disc drive 12, which includes a voice coil motor (VCM) 13, actuator arm 14, suspension 16, flexure 18, slider 20, head mounting block 22, and disc 24. Slider 20 is connected to the distal end of suspension 16 by flexure 18. Suspension 16 is connected to actuator arm 14 at head mounting block 22. Actuator arm 14 is coupled to VCM 13. Disc 24 has a multiplicity of tracks 26 and rotates about axis 28.

During operation of disc drive 12, rotation of disc 24 generates air movement which is encountered by slider 20. This air movement acts to keep slider 20 aloft a small distance above the surface of disc 24, allowing slider 20 to fly above the surface of disc 24. VCM 13 is selectively operated to move actuator arm 14 around axis 30, thereby moving suspension 16 and positioning the transducing head (not shown) carried by slider 20 over tracks 26 of disc 24. Proper positioning of the transducing head is necessary for reading and writing data on concentric tracks 26 of disc 24.

Figure 2:
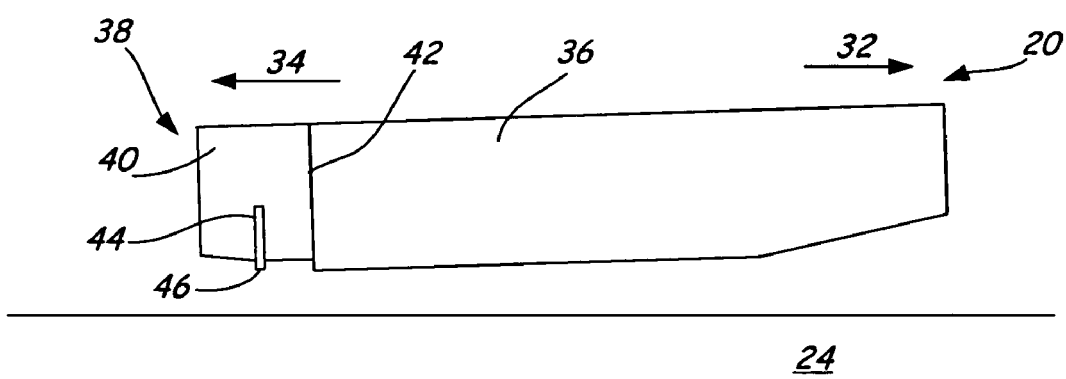
FIG. 2 is a side elevation view of a slider flying above a disc surface.

FIG. 2 is a side elevation view of a slider flying above a disc surface. Direction 32 is designated as a forward or leading direction, and direction 34 is designated as a rearward or trailing direction. Slider 20 includes slider body 36, which is composed of a wafer of an electrically-conductive, ceramic substrate material such as $Al_2O_3$—TiC, AlTiC, TiC, Si, SiC, $ZrO_2$ or other composite materials formed of combinations of these materials.

Transducer portion 38 comprises electrical insulating head stack 40. Interface 42 defines the intersection of the different materials of slider body 36 and transducer portion 38. Head stack 40 is preferably formed of an insulating material, such as $Al_2O_3$, AlN, $SiO_2$, $Si_3N_4$, SiC, or $SiO_{0-2}N_{0-1.5}$.

Generally, the insulating material for head stack 40 is selected to closely match the chemical and mechanical properties of the material used for slider body 36. For example, an $Al_2O_3$ head stack 40 is commonly used in conjunction with an AlTiC slider body 36, since the two materials have similar coefficients of thermal expansion (CTE). Additionally, $Al_2O_3$ is preferred for head stack 40 because of the ease of planarization of the material.

FIG. 2 further shows transducer 44 and transducer pole tip 46. Magnetic head transducer 44 with pole tip 46 is formed of electrically conductive metallized patterns embedded within head stack 40 of transducer portion 38. Such metals, such as NiFe, typically have large CTEs. Because more than one transducer 44 is typically formed within head stack 40, the insulating properties of head stack 40 prevent transducers 44 from shorting each other out during operation. Encapsulation of transducer 44 within head stack 40 is achieved by chemical vapor deposition, a photolithographic process, or another process used in integrated circuit manufacturing.

Figure 3:
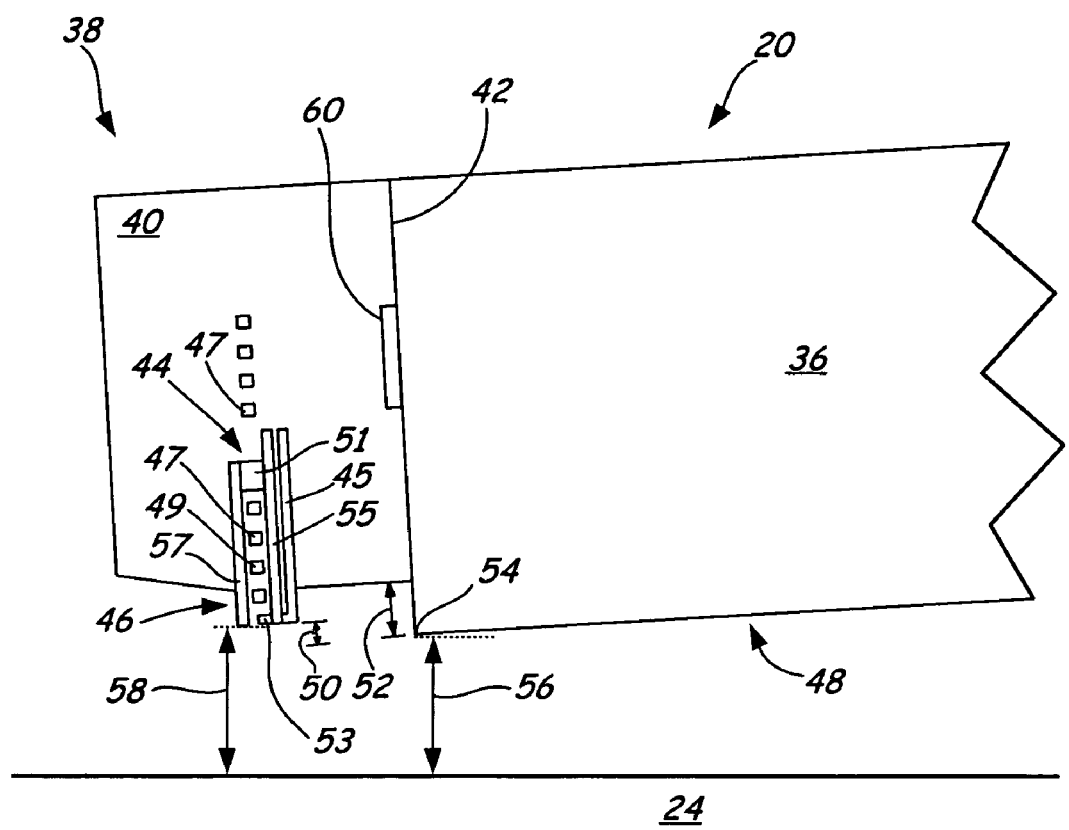
FIG. 3 is an enlarged side elevation of a rear portion of a slider incorporating a film of deformable material.

FIG. 3 is an enlarged side elevation of a rear portion of one embodiment of a slider incorporating a film of deformable material. Transducer 44 generally includes a reader 45 and a writer; the writer generally includes conductive coils 47, core fill 49, back via 51, shared pole extension 53, bottom pole 55 and top pole 57. The portions of bottom pole 55 and top pole 57 which extend from head stack 40 are generally referred to as pole tip 46. Conductive coil 47 wraps around back via 51 such that the flow of electrical current through conductive coil 47 generates a magnetic field for the write operation.

Generally, the materials which make up slider body 36, head stack 40, and transducer 44 differ from each other in respect to their hardness or lapping durability. Usually, the material of transducer 44 is softer than the material of slider body 36. Generally, the material of head stack 40, usually alumina, is softer than the material of transducer 44. These hardness differentials result in varying levels of material recession as the lapping process forms air bearing surface 48 on slider 20 because the softer materials are removed at a higher rate than the harder materials. Subsequent slider processes, such as ion milling, can also affect the variation and average levels of material recession. Air bearing surface 48 is formed on the face of slider 20 which opposes disc 24. The present invention may be used on a symmetric or asymmetric, positive or negative pressure air bearing slider 20, for example.

Pole tip recession 50 and head stack recession 52 are illustrated in FIG. 3. Pole tip recession 50 is the difference in height between the bottom surface of pole tip 46 and the bottom surface of slider body 36. Head stack recession 52 is the difference in height between the bottom of head stack 40 and the bottom of slider body 36. Usually, pole tip 46 protrudes from head stack 40. However, it is contemplated that in some cases, pole tip 46 may recede into head stack 40. Because of the pitch at which slider 20 flies, these recessions result in a mechanical close point 54 of slider 20 at interface 42. This pitch is exaggerated in FIG. 3 for purposes of description. Mechanical close point 54 is the point on slider 20 which is the shortest distance from the surface of magnetic disc 24. This distance is the mechanical close point height 56. As can be seen, pole tip fly height 58 is greater than mechanical close point height 56. In most cases, pole tip fly height 58 is up to about eight percent greater than mechanical close point height 56.

Market demand for increasing hard drive recording density has resulted in a drastic decrease in head media spacing (pole tip fly height 58). Thus, it is preferable that the mechanical close point 54 of slider 20 is at pole tip 46 (as will be discussed later with reference to FIG. 4). In that circumstance, transducer pole tip 46 would be very close to disc 24, thereby resulting in greater recording capacity. An advantage of placing mechanical close point 54 at pole tip 46 is that the configuration improves flyability by decreasing the chance that slider 20 will unintentionally contact disc 24, without a detrimental effect on recording capacity.

The present invention adjusts the pole tip recession 50 of slider 20 after pole tip recession-modifying slider processes such as lapping and ion milling. This pole tip adjustment positions mechanical close point 54 of slider 20 at pole tip 46 through the deformation of deformable material 60 embedded within head stack 40. Deformable material 60 is preferably in the form of a film for ease of manufacture, but it is contemplated that it may take other forms such as a mass of bulk material in the form of a stud or another structure. In one embodiment, deformable material 60 is preferably deposited onto slider 20 by slider manufacturing processes such as sputtering, cold pressing, and pulsed laser deposition. In the embodiment illustrated in FIG. 3, deformable material 60 is preferably disposed in head stack 40 at interface 42; however, it is contemplated that deformable material 60 may be placed anywhere within or on head stack 40 or slider body 36.

Deformable material 60 is capable of undergoing a semi-permanent or permanent deformation. The term "semi-permanent" includes magnetostrictive changes in structure, plastic deformations, and phase transformation induced deformations. Material 60 may be deformed by the application of an activating energy including magnetism, temperature change, pressure force and other forms of excitement. Plastic deformations refer to those in which the deformed material retains its deformed configuration even after removal of the activation or deformation energy. Phase transformation induced deformations are also considered semi-permanent; shape memory alloys (SMA) generally exhibit phase transformation induced deformations. Generally, SMAs are materials that are deformed at a low temperature and then changed back to their original undeformed condition at a higher temperature. This change of shape is believed to result from a transformation from a martensite crystal structure to an austenite crystal structure in a transformation temperature range. As long as the temperature is such so that the SMA remains in one state, the form of the SMA is retained and does not change, even upon removal of the activating energy. Magnetostrictive deformations can be rendered semi-permanent where the deformed configuration of the material is maintained by the placement of a permanent or semi-permanent magnet in the vicinity of the deformable material. In the present invention, it is preferred that the deformation of deformable material 60 is semi-permanent rather than permanent because it may be desirable in some circumstances to reverse the deformation and return deformable material 60 to its initial, undeformed configuration.

Elastic deformations are contrasted with semi-permanent deformations such as plastic deformations, phase transformation induced deformations and magnetostrictive deformations. With elastic deformations, the deformed material returns to its undeformed state upon removal of the activation energy. Thus, with elastic deformations, the activation energy must be continually applied to retain the material in its deformed configuration.

Figure 4A:
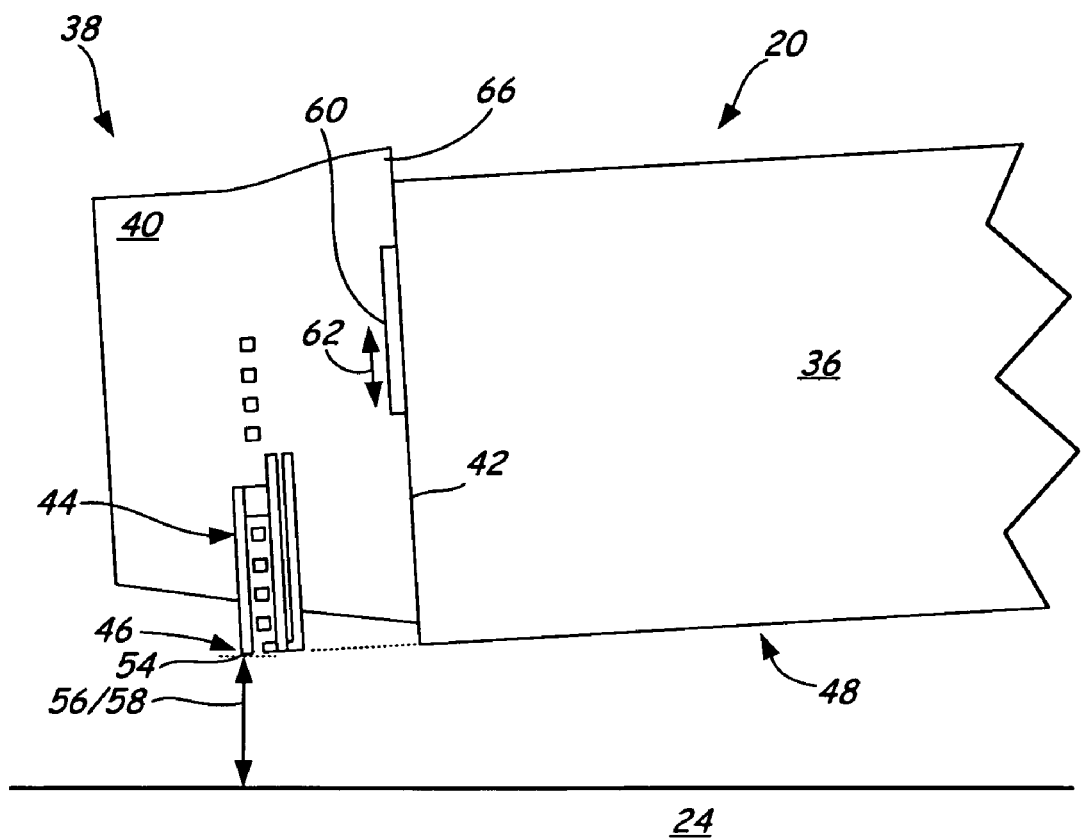
FIG. 4a is a side elevation view of the slider of FIG. 3 after activation of the film in one embodiment.

FIG. 4a is a side elevation view of the slider of FIG. 3 after activation of the film in one embodiment. As shown in FIG. 4, deformable material 60 has been deformed so as to expand and push down upon transducer 44, thereby moving the bottom surface of pole tip 46 to about the same level as the bottom surface of slider body 36. This displacement essentially eliminates the pole tip recession 50 shown in FIG. 3. Because of the pitch at which slider 20 flies, this displacement also moves the mechanical close point 54 to the bottom surface of pole tip 46. Accordingly, mechanical close point height 56 is the same as pole tip fly height 58. This configuration desirably results in increased recording capacity and improved flyability. While FIG. 4 is illustrated with the pole tip recession being equal to zero, it is also contemplated that the pole tip recession may be simply reduced in comparison to FIG. 3, or the pole tip could be moved even further downward, resulting in a slight pole tip protrusion with respect to slider body 36.

While deformable material 60 is illustrated as a film which expands only in the linear direction indicated by arrow 62, it is also contemplated that other depositions of deformable material may be used, including masses of bulk material distributed in other locations within and on slider 20. The deformable film 60 is deposited in head stack material 40 during the processing of head stack 40. During the manufacture of slider 20, deformable material 60 is activated, resulting in a semi-permanent change in strain. The activation may be accomplished by a magnetic field, an applied voltage, surface heating using lasers, cooling, and thermal annealing, for example, or any combination thereof, depending on the magnitude of strain change desired and the composition of shape memory alloy film 60. In some embodiments, the strain is semi-permanent because it may be reversed by exposing deformable material 60 to a magnetic field, voltage, or temperature different in magnitude or character than that used to activate the film.

Where deformable material 60 grows in length in both directions along arrow 62, a bump 66 of head stack material may form as the growth of deformable material pushes the material of head stack 40 in the upward as well as the downward directions.

In one embodiment, deformable material 60 comprises a shape memory material such as a shape memory alloy in the form of a film. Deformations of shape memory alloys are generally phase transformation induced. Shape memory alloys are materials that are deformed at a low temperature and then changed back to their original undeformed condition at a higher temperature. This change of shape is believed to result from a transformation from a martensite crystal structure to an austenite crystal structure in a transformation temperature range. Common shape memory alloys include nickel alloys, such as nickel-titanium alloys, and copper-zinc alloys.

Shape memory alloys include both one-way SMAs and two-way SMAs. One-way SMAs change shape as they are heated without the application of an external force. When one-way SMAs are cooled, however, an external force is needed to reverse the shape change. Two-way SMAs change shape as they are heated without the application of an external force. Two-way SMAs also change shape as they are cooled without the application of an external force. Two-way SMAs are also referred to as reversible SMAs. In the present invention, the use of one-way, two-way SMAs, or both one-way and two-way SMAs in a slider is contemplated. Transformation temperatures of SMA thin films are dependent not only on the composition of the material, but also on its history of thermal processing. Ferromagnetic SMAs are preferably used, including copper and iron based alloys.

Figure 4B:
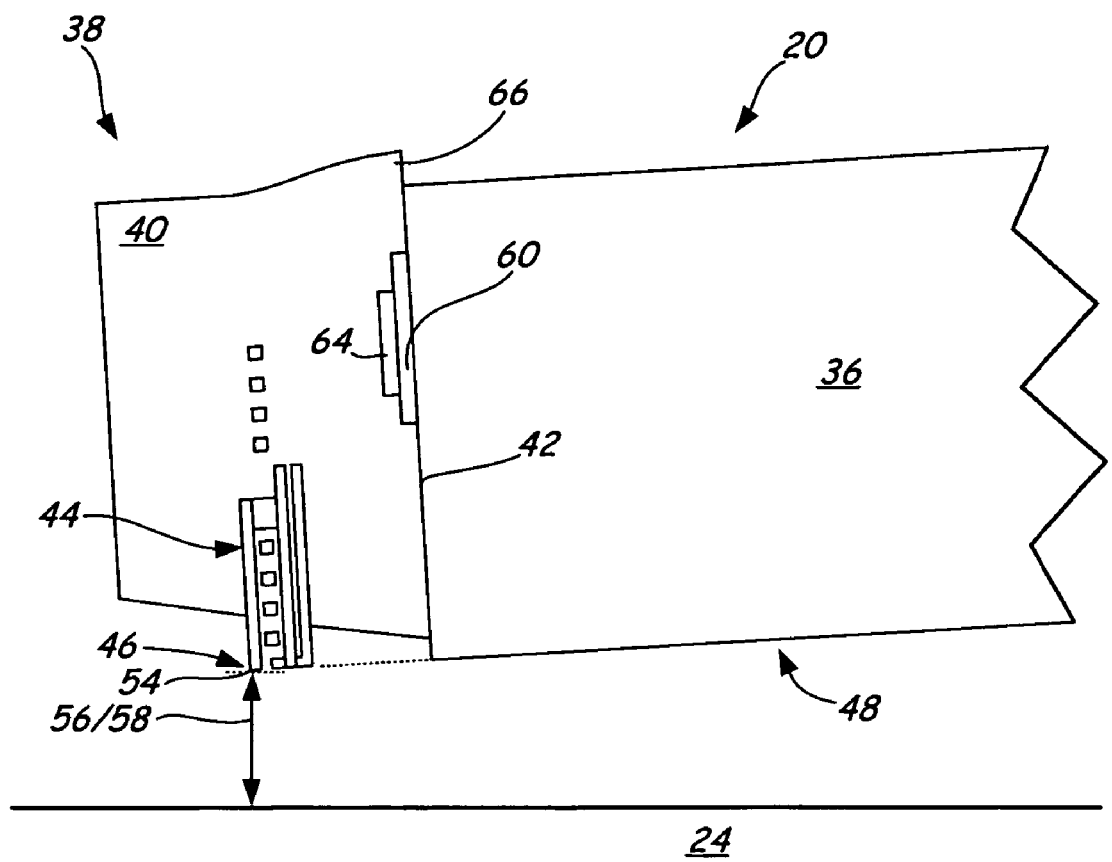
FIG. 4b is a side elevation view of the slider of FIG. 3 after activation of the film in another embodiment.

FIG. 4b is a side elevation view of the slider of FIG. 3 after activation of the film in another embodiment. In an this embodiment, deformable material 60 comprises a magnetostrictive material, the deformation of which is held semi-permanently by magnet 64. The size, location, angle and strength of magnet 64 is chosen to set the strain in deformable material 60 in order to displace pole tip 46 to a desired location. In one embodiment, the coercivity of magnet 64 is at least about 500 Oe (oersted) greater than or less than a coercivity of the slider reader setting. In a preferred embodiment, magnet 64 is set to a magnetic field between about 2 and about 20 kOe to achieve a desired strain. Magnetostrictive materials deform upon exposure to a magnetic field. Examples of magnetostrictive materials include rare-earth-transition-metal (RE-TM) alloys. Particularly suitable magnetostrictive materials for this invention includes those which are ferromagnetic with high coercivity, highly magnetostrictive (i.e., exhibit a relatively large deformation change per unit of applied magnetism), have a large Young's modulus, and compatibility with slider manufacturing processes.

An example of a suitable magnetostrictive material is an alloy of terbium, iron and dysprosium. In one embodiment, a seed layer is deposited onto the forming head stack and a high-coercivity permanent magnet 64 is formed on the seed layer. A layer of the magnetostrictive material 60 is sputtered onto the magnet and the film is crystallized during a high-temperature annealing process. The magnetization of magnet 64 is set to achieve the desired magnetostriction effect. In another embodiment, a layer of magnetostrictive material 60 is deposited onto the forming head stack, with or without the use of a seed layer. Magnet 64 is then deposited on the magnetostrictive material 60.

In a preferred embodiment, the Young's modulus is at least about 20 Gpa. Both Young's modulus and magnetostriction are affected by composition and crystal structure. For instance, some amorphous magnetostrictive materials have a significantly lower magnetostriction than crystalline forms of those materials. Crystalline films of some magnetostrictive materials can be obtained by annealing or deposition at elevated temperatures. The magnitude of PTR adjustment is expected to increase with, individually, increasing volume of deformable material (accomplished by increasing film thickness, for example), increasing Young's modulus and increasing magnetostriction or film strain.

Figure 5:
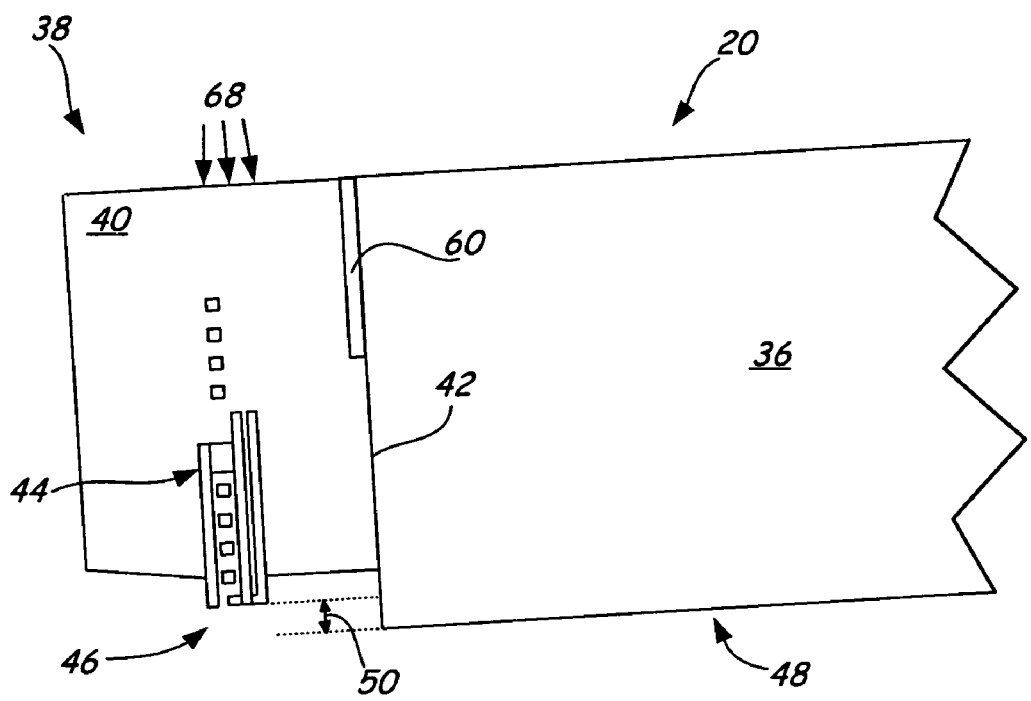
FIG. 5 is an enlarged side elevation of another embodiment of a rear portion of a slider incorporating a film of deformable material.

FIG. 5 is an enlarged side elevation of another embodiment of a rear portion of a slider incorporating a film of deformable material. Deformable material 60 is a film or mass of low-yield-stress material. The low-yield-stress characteristics of deformable material 60 allow the material to be mechanically displaced with a force pressure. Suitable low-yield-stress materials include, for example, soft, malleable metals such as Cu, Al, Au, Ni, Ti and alloys thereof such as AlCu alloys or martensitic NiTi alloys. In one embodiment, low-yield-stress deformable material 60 is deposited between head stack 40 and slider body 36 at interface 42. To reduce pole tip recession 50, mechanical force is applied at force point 68 in one embodiment. The material of head stack 40 is sufficiently bonded to deformable material 60 so that transducer portion 38 does not shear off from slider body 36 at interface 42 when force is applied at point 68.

Figure 6:
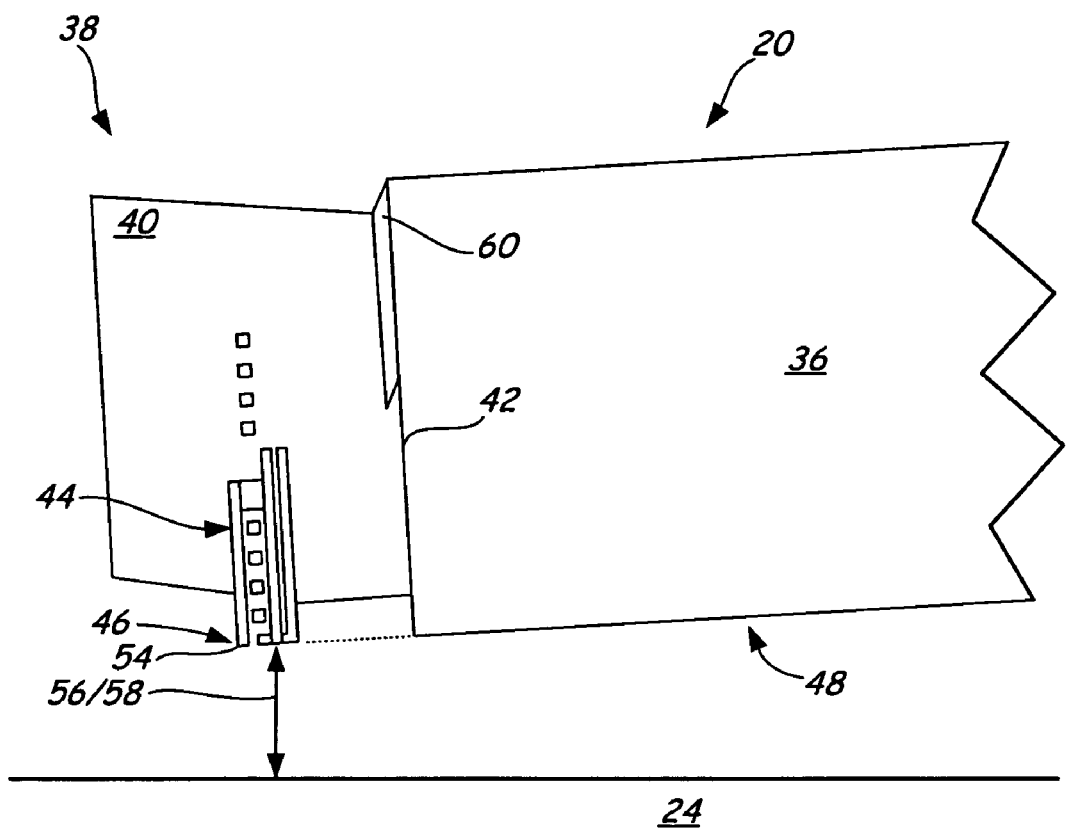
FIG. 6 is a side elevation view of the slider of FIG. 5 after deformation of the film.

FIG. 6 is an enlarged side elevation view of the embodiment of FIG. 5 after deformation. Prior to applying a deformation force, slider body 36 should be mechanically constrained from displacing or rotating during the force application and removal steps. It is expected that materials such as metals with large grain sizes will work especially well. It is preferable that the low-yield-stress characteristics are not so low that fatigue or high temperature causes further unwanted adjustment. The force applied at point 68 causes the bulk of transducer portion 38 to experience elastic deformation; however, the low-yield-stress deformable material 60 experiences a permanent, plastic deformation that will not recover on unloading. Some materials 60 will experience a slight recoil upon unloading; in those cases, the force applied at point 68 should "overpush" to accommodate for such recoil. Force applied at point 68 thereby leads to the displacement of the entire transducer portion 38 with respect to slider body 36. In some embodiments, about 200 to about 1,000 Pascals of pressure are applied.

After the load is released, the displacement remains, as illustrated in FIG. 6. This sliding displacement pushes head stack 40 and transducer 44 downward to effectively reduce or eliminate pole tip recession and thereby result in a mechanical close point of slider 20 at or near pole tip 46. A result is that the mechanical close point height 56 is equal to pole tip fly height 58. Thus, transducer 44 is desirably flying as close to disc surface 24 as possible. As can be seen, pole tip recession 50 and head stack recession 52 no longer affect pole tip fly height 58. Therefore, the invention adjusts the position of pole tip 46 to compensate for pole tip recession 50.

Figure 7:
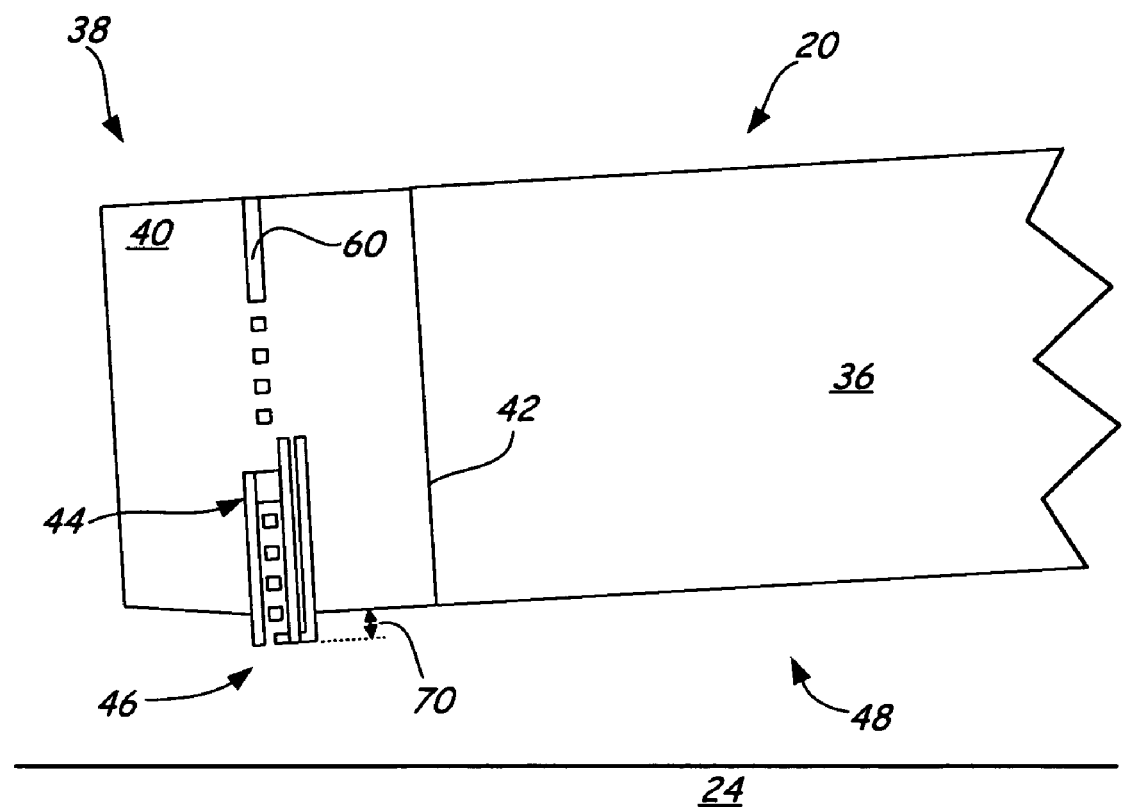
FIG. 7 is a side elevation view of an enlarged portion of a slider wherein the pole tip protrudes from the head stack but does not recede from the slider body.

FIG. 7 is a side elevation view of an enlarged portion of a slider wherein the pole tip protrudes from the head stack but does not recede from the slider body. In some cases, pole tip recession is not an issue; this is the case, for example, when the lapping durability of the material of slider body 36 is not as great as the lapping durability of the material of pole tip 46. Such a case is illustrated in FIG. 7. In this case, a more critical dimension is pole tip protrusion 70. Pole tip protrusion 70 is the difference in height between the bottom of pole tip 46 and the bottom of head stack 40 or slider body 36. While pole tip 46 of slider 72 is able to fly desirably close to the surface of disc 24, pole tip protrusion 70 can lead to accidental contact between pole tip 46 and the surface of disc 24. Such unintentional contact can lead to recording and writing errors as well as disc failure. Therefore, in some cases, it is desirable to decrease or eliminate pole tip protrusion 70. Because the materials of pole tip 46 are very delicate, it is generally not advisable to force pole tip upwards from its bottom surface. Therefore, a contractible deformable material 60 can be used to pull transducer 44 and pole tip 46 upwards with respect to head stack 40.

Figure 8:
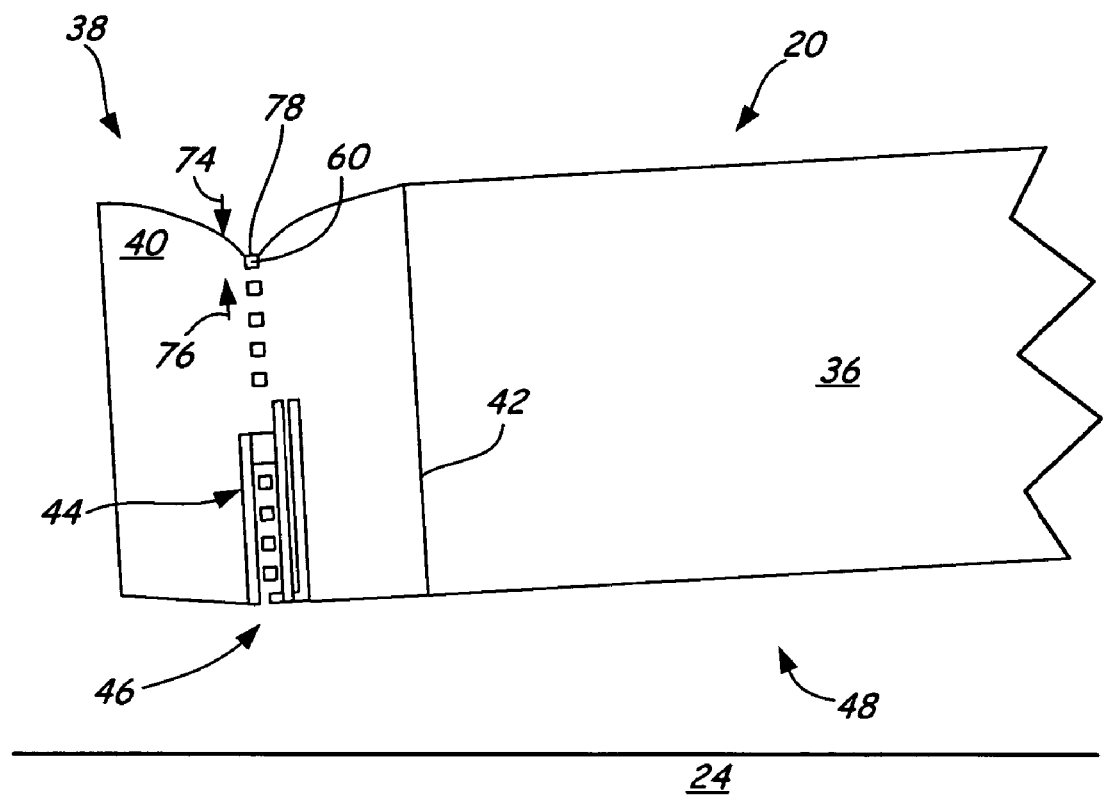
FIG. 8 is a side elevation view of the slider of FIG. 7 after activation of the deformable material.

FIG. 8 is a side elevation view of the slider of FIG. 6, after activation of the deformable material. In one embodiment, deformable material 60 contracts in a linear direction; as it contracts, it pulls at its ends upon the attached head stack material in the directions indicated by arrows 74 and 76. Contraction in the direction of arrow 74 leads to the formation of recess 78 in a top surface of slider 72. Contraction in the direction of arrow 76 pulls transducers 44 and pole tip 46 upward to eliminate or reduce pole tip protrusion 70 (shown in FIG. 7).

In one method of practicing the present invention, pole tip recession or protrusion is measured after the wafers have been divided into bars or individual sliders. The wafers, bars or sliders are then separated based on their required pole tip adjustment. The level of excitation energy is calculated for the required adjustment for each group of wafers, bars or sliders: i.e., magnetization level of permanent magnet layer, temperature and exposure time of thermal energy, intensity and exposure of laser energy, or position and amount of force application, for example.

In the present invention, the position of the pole tip is semi-permanently adjusted during slider formation and no application of activation energy is required during the use of the slider to maintain the pole tip position adjustment. When the deformable material is a shape memory alloy or low-yield-stress material, the phase transformation induced deformation or plastic deformation retains the adjustment even after the removal of the excitation energy. In the case where the deformable material is magnetostrictive, its strain is held by a magnet disposed within the slider itself. While the principles of this invention have been described in connection with specific embodiments, it should be understood clearly that these descriptions are made only by way of example and are not intended to limit the scope of the invention. Workers skilled in the art will recognize that changes may be made in form and detail without departing from the spirit and scope of the invention. For example, it is contemplated that the present invention can be used to change the distance between the bottom of the pole tip and the bottom of the head stack or slider body from any distance to any distance. The term Adistance@ includes zero distance; for example, where there is no pole protrusion or recession from the head stack or slider body.

The invention claimed is:

1. A sensor comprising:
   a transducer portion having an insulating material portion, a transducer and a semi-permanently deformable portion all positioned within the transducer portion;
   wherein a deformation of the semi-permanently deformable portion in response to an activation energy deforms the insulating material portion to position the transducer; and
   wherein the deformation is retained after the activation energy is removed.

2. The sensor of claim 1 wherein the transducer comprises a magnetic transducer positioned within the transducer portion.

3. The sensor of claim 1 in which the semi-permanently deformable portion comprises a low yield stress material.

4. The sensor of claim 1 in which the semi-permanently deformable portion is plastically deformable.

5. The sensor of claim 1 in which the semi-permanently deformable portion comprises a shape memory alloy.

6. The sensor of claim 5 in which the deformation causes the semi-permanently deformable portion to change from a martensite crystal structure to an austenite crystal structure.

7. The sensor of claim 5 in which the deformation causes the semi-permanently deformable portion to change from an austenite crystal structure to a martensite crystal structure.

8. A transducer comprising:
   an insulting material portion;
   a magnetic transducer positioned within the insulating material portion;
   a magnetically responsive deformable portion positioned within the insulating material portion; and
   a magnet having a magnetic field that causes a deformation of the deformable portion;
   wherein the deformation portion in response to the magnetic field adjusts the position of the magnetic transducer within the insulating material portion.

9. The transducer of the claim 8 in which the magnet has a coercivity between about 2 and about 20 kOe.

10. The transducer of claim 9 in which the magnetic transducer has a coercivity and in which the magnet has a coercivity at least about 500 Oe greater than the coercivity of the magnet transducer.

11. The transducer of claim 8 in which the deformable portion is a rare earth transition metal alloy.

12. A method for adjusting the position of a magnetic transducer, the method comprising:
    providing an insulating material portion having a magnetic transducer and a semi-permanently deformable portion positioned within the insulating material portion; and
    deforming the semi-permanently deformable portion with an activation energy to adjust the position of the magnetic transducer within the insulating material portion such that the deforming is retained after the activation energy is removed.

13. The method of claim 12 in which the step of deforming the semi-permanently deformable portion comprises causing a crystal structure transformation of the semi-permanently deformable portion.

14. The method of claim 12 in which the activation energy is selected from the group consisting of temperature change, magnetism, voltage and pressure force.

15. The method of claim 12 in which the step of deforming the semi-permanently deformable portion is completed during manufacture of the transducer.

16. The method of claim 12 and further comprising deforming the semi-permanently deformable portion to reverse the adjustment.

17. The method of claim 12 in which the semi-permanently deformable portion comprises a low yield stress material.

18. The method of claim 12 in which the step of deforming the semi-permanently deformable portion comprises a shape memory alloy.

* * * * *